United States Patent [19]

Guiraud et al.

[11] 4,239,784
[45] Dec. 16, 1980

[54] METHOD FOR PREPARING FOOD PRODUCTS FROM A SUSPENSION OF MILK PROTEINS WITH TEXTURIZATION

[75] Inventors: Richard J. Guiraud; Michel R. Arnaud, both of Vendôme, France

[73] Assignee: Fromageries Bel, societe anonyme, Paris, France

[21] Appl. No.: 922,450

[22] Filed: Jul. 6, 1978

Related U.S. Application Data

[63] Continuation of Ser. No. 742,911, Nov. 17, 1976, abandoned.

[30] Foreign Application Priority Data

Dec. 5, 1975 [FR] France ............... 75 37374

[51] Int. Cl.³ .............................. A23J 3/00
[52] U.S. Cl. .................... 426/104; 426/580; 426/656; 426/657; 426/517; 426/802
[58] Field of Search ............... 426/104, 580, 613, 657, 426/656, 802, 517

[56] References Cited

U.S. PATENT DOCUMENTS

| | | | |
|---|---|---|---|
| 2,682,466 | 6/1954 | Boyer | 426/656 X |
| 2,730,447 | 1/1956 | Boyer | 426/656 X |
| 2,813,794 | 11/1957 | Anson et al. | 426/574 |
| 2,830,902 | 4/1958 | Anson et al. | 426/656 X |
| 3,911,159 | 10/1975 | Heusdens | 426/580 |
| 3,917,876 | 11/1975 | Harwood et al. | 426/580 X |
| 3,958,032 | 5/1976 | Merriam | 426/580 |
| 4,021,584 | 5/1977 | Rankowitz | 426/657X |

FOREIGN PATENT DOCUMENTS

| | | |
|---|---|---|
| 1069458 | 11/1959 | Fed. Rep. of Germany . |
| 2090572 | 12/1971 | France . |
| 2133831 | 12/1972 | France . |
| 2148217 | 3/1973 | France . |
| 2162603 | 7/1973 | France . |
| 2261712 | 2/1975 | France . |
| 294326 | 11/1953 | Switzerland . |
| 1250060 | 10/1971 | United Kingdom . |

OTHER PUBLICATIONS

Sutermeister, E. et al., "Casein and Ks Industrial Applications," Reinhold Publ. Corp., N.Y., 1939, pp. 12–15.

Primary Examiner—Robert A. Yoncoskie
Attorney, Agent, or Firm—Cushman, Darby & Cushman

[57] ABSTRACT

The method for preparing food products from a hydrous paste comprises the preparation of a suspension on basis of milk proteins followed by texturization: A homogenous mixture prepared from an aqueous casein suspension is formed, with or without serum proteins, with or without at least another ingredient selected from the group conprising glucides, lipids and proteins other than milk proteins. The content of milk proteins of the paste is about 10% to about 45%, the water content about 35% to about 85% and the dry material content at least equal to about 15%. In at least one state of the process including preparation of the suspension, texturization and post-texturization, a thermal treatment is applied at a temperature between about 50° C. and about 150° C. for a time up to about 3 hours, optionally in the presence of added divalent ions.

26 Claims, No Drawings

METHOD FOR PREPARING FOOD PRODUCTS FROM A SUSPENSION OF MILK PROTEINS WITH TEXTURIZATION

This is a continuation of application Ser. No. 742,911 filed Nov. 17, 1976, now abandoned.

FIELD OF THE INVENTION

The present invention concerns a method for preparing food from a hydrous paste and, more particularly, a method for preparing food comprising a texturization and a stabilization of milk proteins.

Those skilled in the art of food industry have long sought methods for preparing fibrous proteins from protein materials, which are untexturized and comestible. Indeed, so as to satisfy the needs of mankind, proteins from vegetal, animal, milk or microbial origin have been subjected to an advantageous treatment to convert them to a fibrous structure.

Many methods have been studied for preparing texturized proteins. Fibers have been prepared by extrusion of a protein gel in a basic medium through spinnerets into an acidic coagulation bath (U.S. Pat. Nos. 2,682,466 and 2,730,447).

Another method known under the name of "baking-extrusion" consists of heating a protein paste in the presence of water and extruding this paste in an endless screw, at a high temperature, and under a high pressure. During the expansion, swelling of the paste results in alveolar texture.

All these methods have a number of drawbacks, particularly the requirement of using a complex apparatus with, as a consequence, an important investment. Physico-chemical treatments which are used are very important but generally decrease the functional and nutritional properties of the finished product.

Numerous applications exist for those proteins which have the prospect of being heat-coagulable and can be gelatinized at elevated temperature in the presence of various fillers. As examples, there can be cited U.S. Pat. Nos. 2,830,902 and 2,879,163, wherein there is disclosed a method which consists of extruding a gel, with the aid of a press, into fibers. See French applications published under No. 2,148,217 and No. 2,228,438, wherein there is disclosed the gelatinization of a heat-coagulable protein paste under precise conditions, by the use of so-called "calendering" techniques.

The resulting products have a specific texture which depends upon the choice of the starting materials and the treatment conditions, but which differs from that of meat products.

Moreover, there exist many other methods of texturization.

The most used proteins are generally vegetal origin proteins, such as leguminous plants and, more particularly, soya-bean. The production of these proteins is often geographically limited, which can result in supply problems. Moreover, these proteins of leguminous plants present some drawbacks such as for example:
color
market taste
presence of flatulent sugars
presence of undesirable products, such as antitrypsic factor in soya-bean, gossypol in cotton, aflatoxins in peanuts, etc . . .

Lastly, the texturization methods are very often complex. Said methods required for example proteins having well defined functional properties. These methods thus only rarely allow production of various structures, bits, fibers, etc . . . .

The milk proteins are very interesting protein materials, since they do not possess the previously cited drawbacks and they are products of temperate climates, and are abundant. Moreover, they have remarkable nutritional properties, and have, more than any other proteins, a particular value for the consumer since they are the essential portion of food for young organisms.

However, milk proteins have been very rarely used as texturized proteins, except in cheese technology, essentially for the following reasons:
the mineralized casein or calcium paraphosphocaseinate, known in the milk industry under the name of "caillé presure" (curdled milk rennet) is infusible in hot conditions, but not stable even at ordinary temperature, since the curdled milk grains adhere to each other, so as to form a uniform gel;
the mineralized acidic casein is more stable but hot fusible.
U.S. Pat. No. 2,682,466 already hereinbefore cited deals with the spinning of casein, but the thus obtained fibers are fusible and are not resistant to baking;
the serum proteins are heat-coagulable. Unlike albumin of white of eggs which, on coagulating, produce a solid and homogeneous gel, through coagulation of serum proteins, there is obtained a heterogeneous gel, which is loose enough, containing badly connected aggregates. They are rarely usable as heat-coagulable proteins allowing inclusion of various fillers.

Various studies have been directed to improvement of the stability and fusion of casein. There can be cited the French application published under No. 2,162,603 which stabilizes fibers of calcium paraphosphocaseinate in the reconstituted or native state by immersion of fibers into a bath containing lactates. The fibers obtained in this manner are stabilized but remain fusible.

The art also recognizes co-precipitated proteins. The relative proportions of casein and serum proteins can be varied with respect to the proportion existing in normal milk as it is disclosed in French patent application published under No. 2,160,479. In addition, it is known that coprecipitated serum proteins, either by direct bridging, or by dilution of a gel formed of serum proteins, have an effect of protecting the casein against fusion, as is shown in French application published under No. 2,133,831.

SUMMARY OF THE INVENTION

An object of the present invention is to make a food based on milk proteins prepared by a physical-chemical treatment conventional in milk or cheese industry, the thus obtained food being perfectly stable and infusible and including milk proteins with retained nutritional value.

Another object of the present invention is to provide a method for texturizing these milk proteins by a simple and cheap device.

Another object of the present invention is to provide a method for texturizing milk proteins by any conventional protein spinning or gelation apparatus.

Other objects will become apparent to those skilled in the art to which the present invention, relates from the following description.

These objects are now realized by a method for preparing foods from hydrous paste, comprising the preparation of a suspension based on milk proteins followed by texturization, characterized in that there is formed a homogeneous mixture prepared from a casein aqueous suspension, with or without serum proteins, with or without at least another ingredient selected from the group comprising glucides, lipids, and proteins other than milk proteins, so that the milk proteins content with respect to the paste is about 10% to about 45%, the water content about 35 to about 85% and the dry material content at least equal to about 15%, and in that, in at least one stage of the process including preparation of the suspension, texturization and post-texturization, there is applied a thermal treatment at a temperature between 50° C. and about 150° C., for a time up to about three hours, possibly in the presence of added divalent ions.

In the preceding paragraph, and in the following portion of the specification, and including the claims, the term "casein" will refer to reconstituted or native calcium phosphocaseinate.

The purpose of the thermal treatment is particularly to react serum proteins with casein (casein K) by exchange of disulfide bridges. The concentration of protein material is sufficiently high to realize bridging in serum proteins between neighbouring casein micelles, and thereby to provide a texturized product. By varying the intensity of the thermal treatment or the serum proteins/casein ratio, the texture of the finished product can be modified.

By creating bridging by means of divalent ions such as calcium or by varying pH, this can also act on casein. This action on casein will be a function of the exact thermal treatment and will influence the final texture of the product.

Therefore, the final texture of the product can be regulated by varying any one of numerous parameters such as for example:

the nitrogenous material/dry extract ratio: the higher this ratio, the higher the probability of forming bridges between proteins the serum proteins/casein ratio: the higher this ratio, the more numerous the bridges by exchange of disulfide bridges. Beyond a certain limit, there is a saturation of casein sites and the serum proteins will behave in a different way (like a filler).

the concentration of divalent ions, especially calcium: up to a certain limit, the higher the calcium concentration at a given pH, the more prevalent the casein-calcium-casein bridges.

the intensity of the thermal treatment by regulating the time-temperature couple: the higher the thermal treatment, the more important the reaction of serum proteins on casein. Beyond a certain limit (for example 90° C. for ten minutes), all the serum proteins will have reacted with respect to all of the active sites on casein.

the water content: when the water content decreases, and this up to a certain limit, the protein concentration increases and therefore the probabilities of bridging between proteins are increased. Beyond this limit, problems due to the viscosity of the medium intervene to the detriment of the reaction capabilities. The proteins being very hydrophilic, total water is distributed as water linked with proteins and as free water used for solvating ions.

When the protein concentration increases, the proportion of solvatation free water decreases, and the action of dissolved ions, particularly Ca ions, is decreased.

In food products of the present invention, the ratio between the serum proteins and casein is between about 0 and about 6 and the ratio between the fatty material and the dry material is at most equal to about 50%.

In a preferred embodiment of the present invention, milk proteins and serum proteins are used, as being partially freed from lactose and ash through ultrafiltration treatment.

Supplementary and optionally additional components of the paste, can include carbohydrates, preferably lactose, in a proportion at most equal to about 70% of the dry material, as well as non milk proteins in a proportion at most equal to about 30% of milk proteins.

Divalent ions, preferably calcium ions, are used in this hydrous paste at a concentration between 0.25% and 6% with respect to milk proteins. This ion addition is carried out before and/or during the shaping, if it is produced in an aqueous solution of calcium chloride, for example, and/or after shaping, if the structure is immersed into an aqueous solution of calcium chloride, for example.

The thermal treatment is carried out, under the previously indicated conditions, in a hot air oven, in a microwave oven or by contact with a heated wall with or without moving. This treatment can be also carried out by means of a fluid, generally speaking water, in the liquid or gaseous state. This water in the liquid state can contain calcium chloride at a variable concentration up to saturation point or salts other than calcium chloride, contributing to stabilization of the structures obtained by shaping. The pH of water in the liquid state is between 4.5 and 7.5.

Below 35% of dry extract, it is necessary to shape this paste, as in example 1, with a thermal treatment before shaping, as hereinafter indicated.

Above 35% of dry extract, it is possible to shape this paste, as in example 3, with a thermal treatment during or after shaping, as hereinafter indicated.

In any case, this limit of about 35% will change depending upon the following parameters:

If the calcium content/milk proteins ratio increases, the limit zone is below 35% of dry extract, If the serum proteins/casein ratio increases, the limit zone is below about 35% of dry extract, If the milk proteins/dry extract ratio increases, the limit zone is below about 35% of dry extract.

If the intensity of the thermal treatment increases, the limit is below about 35% of dry extract.

By varying any one of these parameters, there can be obtained an infinite number of different textures. The sequence of application of these parameters can be varied, for example by addition of calcium before or after shaping, etc. . . .

The texturization of the hydrous paste is carried out with or without agitation. The thermal treatment is sufficiently important to obtain reactions in the core of the mass. This treatment provides texturized products having various consistencies.

The hydrous paste can be texturized in various forms, for example:

(1°) ribbons having variable thickness and width;

(2°) fibers obtained by exerting an excess of pressure (over pressure) through a spinneret having a variable diameter;

(3°) granules or bits of variable dimensions, obtained by using guillotines at the outlet of extrusion nozzles having variable shapes and dimensions, these spinnerets being able to have a profile selected so as to give to the texturized product a special form.

In preceding cases (1°) to (3°), there can be acted on the rate of swelling (or suspension) of the paste.

(4°) Alveolar structures can be given to the structured product by swelling the hydrous paste before texturization.

In any case, it is possible to carry out the treatments with or without any stirring.

All these texturized products can be worked up again by being reduced through cutting and/or by being agglomerated by various binding agents.

The texturized products can be submitted to any of the preservation treatments including excess of gelation, freezing, sterilization and dehydration by anyone of the conventional methods, namely, lyophilization, hot air, vacuum, microwaves, etc. . . .

The dehydrated texturized products can be rehydrated in cold or hot water. The time required for rehydration will depend upon the water temperature, the dimension of texturized products and their texture and, the water uptake equal or higher than that of the product before dehydration will require some minutes.

By regulating the texture by the aforementioned parameters, as well as by selecting coloration or aromatization and a suitable shaping, the resulting texturized products can be used as substitutes for meat products, for fishing products and any other conventional or new use in the food industry, or as additives of these same products.

The physico-chemical treatment of the invention produces milk proteins of a high nutritional value.

The present invention consists of using particularly the hereinabove mentioned properties of serum proteins, in a more concentrated medium than normal milk, so as to take advantage of bridging possibilities by these mineral matters or by serum proteins, so as to obtain sufficiently solid textured products. In other words, experimental conditions are selected in such a way that it is possible to coprecipitate serum proteins and casein as a texturized structure. In order to increase the proportion of nitrogen materials with respect to the dry extract, by comparison with milk, there can be used proteins obtained by ultrafiltration. In the following part of the specification, there will be mentioned the term UFL in the case of a retained product from ultrafiltrated skimmed milk and the term UFS will be applied to the case of a retained product from ultrafiltrated serum. These denominations will be followed with a number representing the ratio of nitrogen materials on the dry extract, for example UFL 70=retained product from milk containing 70% of nitrogen materials in the dry state.

DESCRIPTION OF THE PREFERRED EMBODIMENTS

The following examples, which are not limiting, will serve to more clearly illustrate the invention.

EXAMPLE 1

A hydrous paste is formed by kneading for 30 min. at 20° C., 2.25 kg of UFL 70 and 0.75 kg of UFS 70, with 7 kg of water; the composition of the paste is the following one, E.S. designating the dry extract:

|  | 1 |
|---|---|
| % of dry material extract (E.S.) | 27.7 |
| % of total proteins/E.S. | 71.3 |
| % of soluble serum proteins/E.S. | 28.4 |
| % of soluble serum proteins/total proteins | 39.8 |
| % of calcium/total proteins | 2.1 |

The viscosity of the paste is 2.7 poises.

Under agitation, the temperature of the paste is brought to 80° C. The rise of the temperature lasts for 20 min., and the whole product is maintained at 80° C. under agitation for 1 min. By continuing the agitation, the paste is cooled down to 20° C., partially deaerated and homogenized in a piston homogenizer. The paste viscosity is then about 90 poises.

The composition of the paste is as follows at this time:

|  | 1 |
|---|---|
| % of dry solids (E.S.) | 27.6 |
| % of total proteins/E.S. | 71.6 |
| % of soluble serum proteins/E.S. | 16.4 |
| % of soluble serum proteins/total proteins | 22.9 |
| % of calcium/total proteins | 2.1 |

The action of temperature has allowed a fraction of the serum proteins to react with the casein fraction. The concentration of dry extract of the paste in this case is such that the thermal treatment does not allow the paste to set.

The protein paste is extruded through a spinneret, comprising holes being of 1 mm in diameter, by means of an overpressure of 0.3 bar, in an aqueous solution (at 90° C.) of 15% sodium chloride and 19% calcium chloride. There are produced almost instantly a hardening of fibers, a bleaching and a change in the gel opacity. Fibers remain in the bath for about 3 min. so as to allow the penetration of ions into the mass.

The composition of fibers is at this time:

|  | 1 |
|---|---|
| % of dry solids (E.S.) | 55.2 |
| % of total proteins/E.S. | 50.3 |
| % of soluble serum proteins/E.S. | 4.6 |
| % of soluble serum proteins/total proteins | 9.1 |
| % of calcium/total proteins | 8.8 |

The washing of fibers is made for 20 min. with water at 20° C. so as to free fibers from the non fixed salts. The excess of water is thereafter removed.

|  | 1 |
|---|---|
| % of dry solids (E.S.) | 29.2 |
| % of total proteins/E.S. | 86.9 |
| % of soluble serum proteins/E.S. | 4.6 |
| % of soluble serum proteins/total proteins | 5.3 |
| % of calcium/total proteins | 2.2 |

The soluble serum protein fraction decreases during the coagulation phase in the bath at 90° C. since, on one hand, the reaction with casein is able of being extended and, on the other hand, a solubilization in the bath is possible.

During washing of fibers, calcium not bonded with proteins is removed whereas, in the starting hydrous paste, only a fraction of present calcium is found under a bonded form.

The calcium action is important on the texture of the thus obtained fibers. Indeed, it is checked that, in unwashed fibers, the calcium rate is far more significant than in the starting hydrous paste. Parallel experiments show well that if the final content of calcium bonded with fibers is changed either by modifying the concentration of calcium chloride in the coagulation bath or by modifying the residence time of the fibers in the coagulation bath, different textures are obtained for fibers the solubility of which varies according to the calcium content.

EXAMPLE 2

In the same way as disclosed in example 1 in connection with the calcium role, the significance of the serum proteins/casein fraction ratio, and of the thermal treatment can be put into evidence. Thus, by operating as disclosed in example 1, three hydrous pastes are prepared, the milk protein compositions of which are the following ones:

|  | 2.1 | 2.2 | 1 |
|---|---|---|---|
| % UFL 70 | 30 | 25 | 22.5 |
| % UFS 70 | 0 | 5 | 7.5 |
| % of total dry solids | 30 | 30.00 | 30.0 |
| $\frac{\text{serum proteins}}{\text{casein fraction}}$ ratio | 0.25 | 0.50 | 0.66 |

The compositions of these three pastes expressed as a percentage before the thermal treatment are the following ones:

|  | 2.1 | 2.2 | 1 |
|---|---|---|---|
| % of dry solids (E.S.) | 28.3 | 28.0 | 27.7 |
| % of total proteins/E.S. | 71.0 | 70.3 | 71.3 |
| % of soluble serum proteins/E.S. | 14.2 | 23.4 | 28.4 |
| % of soluble serum proteins/total proteins | 20.0 | 33.3 | 39.8 |
| % of calcium/total proteins | 2.3 | 2.2 | 2.1 |

The treatments are analogous with those disclosed in Example 1. The composition expressed in percentage and the fiber texture after washing are indicated as follows:

|  | 2.1 | 2.2 | 1 |
|---|---|---|---|
| % of dry solids | 21.6 | 25.8 | 29.2 |
| % of total proteins/E.S. | 87.8 | 80.1 | 86.9 |
| % of soluble serum proteins/E.S. | 2.0 | 6.7 | 4.6 |
| % of soluble serum proteins/total proteins | 2.3 | 8.4 | 5.3 |
| % of calcium/total proteins | 5.5 | 3.1 | 2.2 |
| Texture | tender texture -looking like a gel-stable and infusible (limit) | supple texture - stable infusible | tight texture - stable infusible |

It is checked that the dry extract increases in accordance with the content of serum proteins, which is normal and brings forth an important change in the final texture of the washed fibers. It is also noticed that the content of bonded calcium increases in the same time as the casein content. When casein has fixed serum proteins, the capabilities of binding between casein and calcium are decreased. Calcium and serum proteins do not lead to similar textures, which results in the fact that the final texture of fibers can be modulated as a function of these both parameters.

Also, the intensity of the thermal treatment can be modified by means of the heating duration and of temperature. Thus, by operating as disclosed in example 2.2., the paste of example 2.2 is submitted to different thermal treatments.

|  | 2.3. | 2.4. | 2.5. | 2.2. |
|---|---|---|---|---|
| Duration of the temperature rise | 20 min | 20 min | 20 min | 20 min |
| Duration of temperature keeping | 1 min | 1 min | 20 min | 1 min |
| Reached temperature | 61° C. | 73° C. | 70° C. | 80° C. |

Treatments thereafter are analogous with those disclosed in example 1, and the composition expressed in percentage and the texture of fibers after washing are indicated hereinafter:

|  | 2.3. | 2.4. | 2.5. | 2.2. |
|---|---|---|---|---|
| % of dry solids | 17.6 | 21.8 | 25.5 | 25.8 |
| % of total proteins/E.S. | 60.7 | 82.7 | 83.1 | 80.1 |
| % of soluble serum proteins/E.S. | 17.5 | 5.6 | 6.6 | 6.7 |
| % of soluble serum proteins/total proteins | 28.8 | 6.8 | 7.9 | 8.4 |
| % of calcium/total proteins | 8.6 | 2.8 | 3.0 | 3.1 |
| Texture | Soft, instable and fusible texture | Tender, stable and infusible texture | Supple, stable and infusible texture | Supple, stable and infusible texture |

It is checked that the intensity of the thermal treatment (time-temperature) influences greatly the stability and the fusibility of the thus obtained fibers. Indeed, when the intensity of the thermal treatment is weak as in example 2.3., reactions between serum proteins and casein are not very numerous and the thus obtained fibers are instable (they form again a gel by contacting one another) and fusible (they melt in boiling water or in fat or grease). On the contrary, in examples 2.2. and 2.5. wherein the thermal-treatment is important, the thus obtained fibers are stable and infusible.

EXAMPLE 3

A hydrous paste is formed by kneading for 30 min at 20° C. 1.208 kg of UFL 70 and 0.514 kg of UFS 70, 0.075 kg of NaCl and 2.56 kg of water. Thereafter, a mixture premelted at 40° C. of 0.109 kg of vegetal fatty material (MP=38°–39° C.) and 0.010 kg of glycerol monostearate is incorporated, and the whole mass is kneaded for ten minutes at equilibrium temperature. The paste is homogenized in a piston homogenizer. Its final viscosity is about 220 poises.

The composition of the paste is at this time:

|  | 3 |
|---|---|
| % of dry solids | 41.9 |
| % of total proteins/E.S. | 64.1 |
| % of soluble serum proteins/E.S. | 29.8 |
| % of soluble serum proteins/total proteins | 46.5 |

-continued

| | 3 |
|---|---|
| % of calcium/total proteins | 2.3 |

In this case, contrarily to example 1, there is no thermal treatment before spinning. Indeed, the concentration of dry extract and therefore the concentration of milk proteins are such that an even moderate thermal treatment (example 2.3.) would coagulate into a mass the hydrous paste.

The proteic paste is extruded through a spinneret comprising holes being 2 mm in diameter, by means of an overpressure of 0.8 bar on a heating plate brought to 132° C. A hardening of the thus obtained fibers which can be used as such is obtained.

In this case, the composition of the fibers as a percentage is the following one:

| | 3 |
|---|---|
| % of dry solids | 46.8 |
| % of total proteins/E.S. | 64.6 |
| % of soluble serum proteins/E.S. | 23.3 |
| % of soluble serum proteins/total proteins | 36.0 |
| % of calcium/total proteins | 2.3 |
| Texture | tender texture - fragile |

The temperature of the heating plate and the contact time of the fibers with this plate influence directly the texture and the keeping (or holding) of the thus obtained fibers.

It has been checked that the amount of soluble proteins in this case has decreased. It depends directly upon the intensity of the thermal treatment, which can be carried out in different ways: hot air oven, rotating cylinder, metal strip, microwaves, liquid or gaseous thermal fluid, etc . . . .

The thus obtained fibers can also be taken up with water at about 90° C., which, on one hand, by dissolving the soluble substances and, on the other hand, by allowing the reaction of casein with serum proteins to be extended possibly, makes the fibers texture vary. If the bath contains moreover calcium chloride, calcium ions can contribute to the reinforcement of fiber texture. In this last case, an additional bath for washing in water at 40° C. is necessary to remove the salt excess in fibers.

The composition of the fibers as a percentage in this case is the following one:

| | Fibers according to example 3 washed in water at 90° C. 3.1. | Fibers according to example 3 immersed in an aqueous 19% solution of CaCl$_2$ at 90° C. and washed in water at 40° C. 3.2. |
|---|---|---|
| % of dry solids | 18.2 | 22.0 |
| % of total proteins/E.S. | 76.2 | 78.3 |
| % of soluble serum proteins/E.S. | 3.3 | 5.4 |
| % of soluble serum proteins/ total proteins | 4.3 | 6.9 |
| % of calcium/ total proteins | 1.9 | 2.5 |
| Texture | Supple texture - very spongious - acceptable | Very ferm texture - spongiuous - good keeping |

| | Fibers according to example 3 washed in water at 90° C. 3.1. | Fibers according to example 3 immersed in an aqueous 19% solution of CaCl$_2$ at 90° C. and washed in water at 40° C. 3.2. |
|---|---|---|
| | keeping | |

EXAMPLE 4

Operation is made exactly like in example 3 but by adding to the hydrous paste before kneading Ca, as CaCl$_2$, 2H$_2$O in an amount of 1.08% with respect to milk proteins. The treatments of the paste are analogous with those of example 3.1. The thus obtained fibers are taken up with a water bath at 90° C., the function of which is comparable with that one of example 3.1. In this case, however, water by soaking fibers allows the calcium action to be more efficient. Indeed, in the initial hydrous paste, water is found partially bonded to proteins. The residual free water is in too low a proportion to permit a good solvation and a good transfer of calcium ions.

In this case, the composition of fibers as a percentage is the following one:

| | 4 |
|---|---|
| % of dry solids | 23.1 |
| % of total proteins/E.S. | 74.1 |
| % of soluble serum proteins/E.S. | 8.3 |
| % of soluble serum proteins/ total proteins | 11.2 |
| % of calcium/total proteins | 2.7 |
| Texture | Very firm, spongious texture - Good holding |

Example 4 presents a number of advantages over example 3.2 because the calcium contents in both cases are very neighbouring, but the manufacture procedure is simplified (a single bath in example 4 whereas two baths are used in example 3.2., with an amount of intervening calcium chloride far greater in this last case).

EXAMPLE 5

In examples 1 and 2, the total dry extract of the hydrous paste is lower than 35% and, in this case, it is possible to carry out a thermal treatment before extrusion. In examples 3 and 4, the total dry extract of the hydrous paste is higher than 35% and, in this case, a thermal treatment before extrusion is not possible, since it would lead to the paste setting. This can be explained by the difference of dry extract and, therefore, everything being otherwise equal, by the difference in milk protein concentration. The increase in the concentration allows to increase indeed the bridging capabilities by calcium and serum proteins, so as to obtain firmer and firmer textures.

This phenomenon can be put into evidence by making the total dry extract of a hydrous paste very between 25% and 45% and keeping the following features constant:
% of calcium/milk proteins: 2.1
Serum proteins/casein: 0.66
Milk proteins/total dry extract: 0.7

Thermal treatment

Temperature rise: 20 min
Temperature keeping: 1 min
Reached temperature: 80° C.

The thermal treatment of the paste maintained in an agitation state is carried out in all the cases under the same conditions. It is then possible to connect the paste aspect after the thermal treatment as a function of E.S.. The following results are obtained:

| Dry solids of the hydrous paste | 25% | 30% | 35% | 40% |
|---|---|---|---|---|
| Paste aspect | Homogenous | Homogenous | Non homogenous | Non homogenous |
| After thermal treatment | | | Fine Grain Size | Significant grain size:bits |

EXAMPLE 6

A hydrous paste is formed by kneading 1.54 kg of calcium phosphocaseinate powder reconstituted with 3.160 kg of water.

The paste is homogenized in a piston homogenizer. Its final viscosity is 190 poises. The paste is thereafter extruded as in example 3, on a heating plate. Tender enough fibers which are stable and infusible are obtained. In this case, serum proteins being not present, only the ionic bridges intervene so as to allow the texturization in the paste.

This phenomenon can be shown by taking up these fibers with acidic baths. It is checked that as pH of the bath decreases, the immersed fibers become tenderer and fusible up to the loss of any texture in a bath at pH 4.5. As pH decreases, here is demineralization of caseinate and destructuration of the network formed by bridges between ions, up to complete destruction.

EXAMPLE 7

The procedure is as in example 1. The paste cooled down to 20° C., the viscosity of which is about 120 poises, is swollen by nitrogen injection under pressure. The swollen paste can be extruded in a spinneret of 10 mm in diameter in a NaCl and $CaCl_2$ bath at 90° C. as shown in example 1. An expansion increase is instantly produced through dilatation of dispersed gas bubbles, followed with the hardening of the thus obtained foam. Once washed so as to remove the excess of salts, this foam can be cut, thereafter dried by anyone of conventional technics. This dried foam, due to its alveolar structure, is easily rehydrated in water even at room temperature.

EXAMPLE 8

The procedure is as in example 3 by adding to the hydrous paste selected dyestuffs and flavourings. The fibers are disposed in a mould with an aqueous binding agent containing fatty materials, glucids, heat-coagulable proteins, salts, flavouring and dyestuffs. The closed mould is disposed into a water bath for 30 min. After demoulding and cooling, the block can be cut according to the desired shape. The thus obtained bits can be incorporated according to variable rates in pork-butchery preparations according to the selected flavouring or dehydrated. Rehydration in cold water or in boiling water is easy.

EXAMPLE 9

The procedure is as in example 8 with a flavouring and a coloration of the ham type. The composition of fibers and of the binding agents is regulated so that it is close to the average ham composition for example. The block is placed into a natural gut and is submitted to conventional treatments of an entire pork-butchery piece (dryer, smoking room . . . ). The block can be cut into fine slices which have the aspect, the taste and the texture of smoked ham.

What is claimed is:

1. A method for preparing food products from a hydrated paste based on milk proteins, comprising the steps of
   (1) providing a hydrated paste of milk proteins comprising a homogeneous mixture prepared from an aqueous casein suspension wherein the content of milk proteins with respect to the paste is about 10% to about 45%, the water content is about 35 to about 85% and the dry material content is at least equal to about 15% wherein said milk proteins further contain phosphorous in amount effective to produce phosphocaseinate bridges;
   (2) molding said paste to prepare a texturized product in the form of ribbons, fibers, granules or bits, and
   (3) subjecting the paste to a thermal treatment at a temperature between about 50° C. and about 150° C., for a time sufficient and up to about 3 hours to produce phosphocaseinate bridges between casein molecules.

2. The method of claim 1, wherein said paste further includes serum proteins wherein the ratio of said serum proteins to casein is up to about 6.

3. The method of claim 2, wherein Serum proteins are present at a level sufficient for disulfide bridges to form between proteins contained in said paste during step (3).

4. The method of claim 1 wherein said milk proteins are subjected to ultrafiltration.

5. The method of claim 1, wherein said milk proteins include a carbohydrate which is present in an amount ranging up to 70%, based on the amount of said dry material.

6. The method of claim 5 wherein said carbohydrate is lactose.

7. The method of claim 1, wherein said paste includes fatty material which is present in an amount ranging up to 50% based on the amount of said dry material.

8. The method of claim 1, wherein said paste contains protein other than said milk proteins in an amount ranging up to 30% based on said milk proteins.

9. The method of claim 1, wherein said paste contains divalent ions in an amount ranging from 0.25 to 6% based on the amount of said milk proteins.

10. The method of claim 9, wherein said divalent ions are calcium ions.

11. The method of claim 10, wherein said calcium ions are added before or during step (2).

12. The method of claim 10, wherein said calcium ions are added after molding by immersing the molded paste into an aqueous solution containing calcium ions.

13. The method of claim 11, wherein the source of calcium ions is calcium chloride.

14. The method of claim 12, wherein said aqueous solution contains calcium chloride.

15. The method of claim 1, wherein said paste contains less than about 30% dry material and wherein said hydrated paste is subjected to said thermal treatment prior to step (2).

16. The method of claim 1, wherein said paste contains more than about 35% dry materials and wherein said thermal treatment is undertaken during said step (2).

17. The method of claim 1, wherein said paste contains more than about 35% dry materials and wherein said thermal treatment is undertaken after step (2).

18. The method of claim 1, wherein said heat treatment is effected by employing gases heated to temperatures sufficient to produce said phosphocaseinate bridges.

19. The method of claim 1, wherein said heat treatment is effected with liquids heated to a temperature sufficient to produce said phosphocaseinate bridges.

20. The method of claim 19, wherein said liquid is water which contains calcium chloride in amounts ranging up to the saturation point.

21. The method of claim 20 wherein said water further includes sodium chloride in amounts sufficient to stabilize said molded structure.

22. The method of claim 20, wherein the pH of the water is between about 4.5 and 7.5.

23. The method of claim 1, wherein said homogeneous mixture includes supplemental amounts of at least one material selected from the group consisting of glucides, lipids and proteins other than milk proteins.

24. The method of producing food products from a hydrated paste based on milk products consisting essentially of the steps of claim 1.

25. A product produced by the method of claim 1.

26. The product produced by the method of claim 3.

* * * * *